INVENTORS.
FREDDY DAVIS
CHARLES R. FISHER, JR.
WILLIAM V. TYRLICK
BY H. Vincent Harsha
ATTORNEY Oct. 27, 1964 F. DAVID ETAL 3,154,771

MULTIPLE SELECTION SYSTEM

Filed Oct. 19, 1959 5 Sheets-Sheet 2

Oct. 27, 1964 F. DAVID ETAL 3,154,771

MULTIPLE SELECTION SYSTEM

Filed Oct. 19, 1959 5 Sheets-Sheet 5

United States Patent Office 3,154,771
Patented Oct. 27, 1964

3,154,771

MULTIPLE SELECTION SYSTEM

Freddy David, Rochester, Charles R. Fisher, Jr., Pittsford, and William V. Tyrlick, Rochester, N.Y., assignors to General Dynamics Corporation, Rochester, N.Y., a corporation of Delaware Filed Oct. 19, 1959, Ser. No. 847,251
3 Claims. (Cl. 340—174.1)

Figure 1:
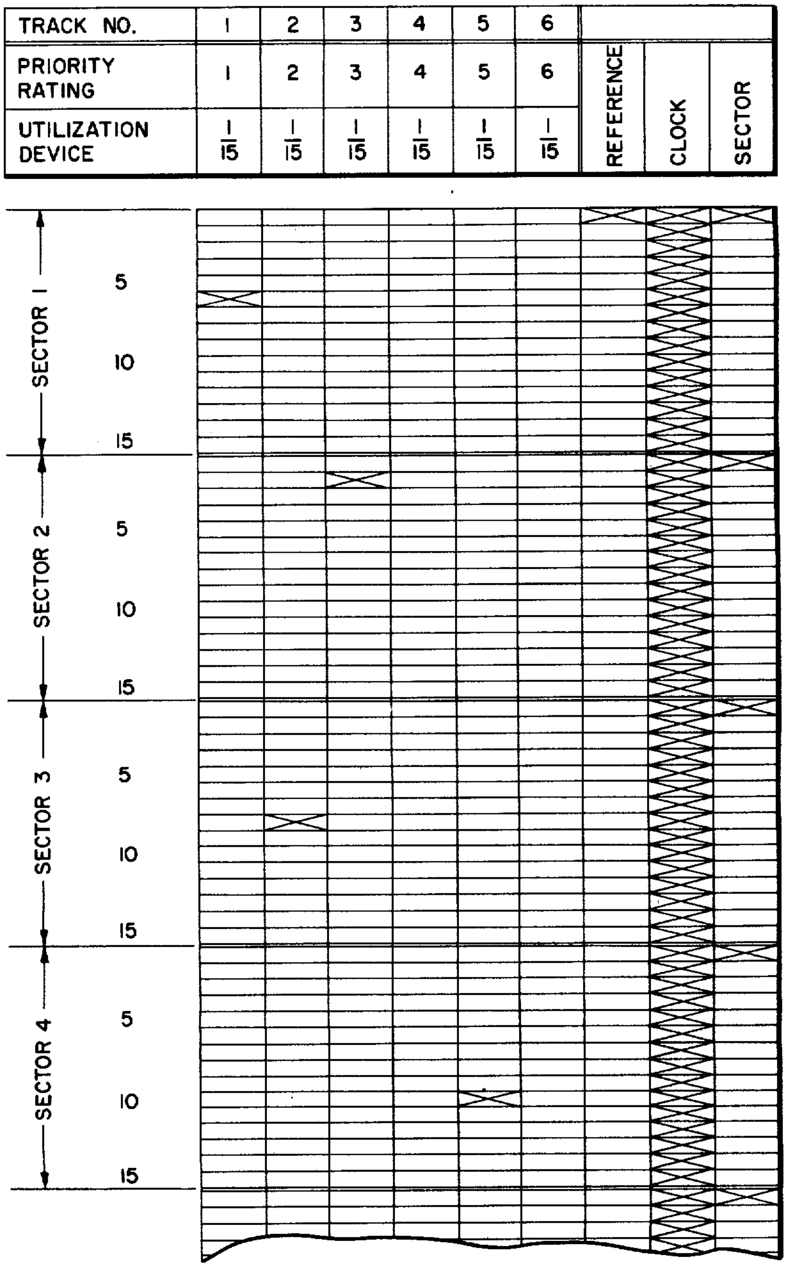

The present invention relates to multiple selection systems and, more specifically, to a multiple selection system as used with a switching scheme in which any one of a plurality of signal groups recorded from a plurality of recorded signal sources may be directed to any combination of a plurality of utilization devices in accordance with a predetermined program in respect to destination and priority.

Although systems of his type may be used in a large variety of applications, one specific example is in the teletypewriter switching field. In installations of this type, it is mandatory that the messages received upon any one of a large number of incoming lines may be recorded and later directed to any one or combination of a large number of outgoing lines, depending upon the destination of the received message. In addition, the received messages may have a variety of priority precedences, therefore, it is mandatory that the recorded messages of the highest priority precedence be transmitted before recorded messages of a lower priority precedence.

Generally, there are several storage devices for the purpose of recording incoming messages, and therefore these devices which become recorded signal sources are common equipment, that is, any outgoing line may have transmitted therethrough the messages recorded on any one of the recorded signal sources.

In view of this, it is necessary to provide a system by which any one or combination of a plurality of outgoing lines may be connected to those recorded signal sources containing messages destined therefore, in descending order of priority precedence.

It is, therefore, an object of this invention to provide an improved multiple selection system.

It is another object of this invention to provide an improved multiple selection system employing only solid state components.

It is another object of this invention to provide a multiple selection system which may provide for the connection of any one or combination of a plurality of signal sources in accordance with a preselected program in respect to destination and priority.

In accordance with this invention, a multiple selection system which may provide for the connection of any one or combination of a plurality of signal utilization devices to any one of a plurality of recorded signal sources in accordance with a predetermined program in respect to priority and destination is provided wherein a magnetic recording drum is divided into a plurality of sector divisions, each corresponding to a respective recorded signal source, priority track divisions, each corresponding to a respective priority rating and slot divisions, each corresponding to at least one respective utilizaiton device in such a manner that the intersection of the priority track and slot divisions within each sector division form a plurality of sub-division cells each adapted to store a single data signal whereby a data signal present within any cell denotes the presence of a signal group in the recorded signal source to which the sector division containing that cell corresponds to a destination and priority as determined by the priority track and slot divisions which intersect to form that cell. The magnetic drum is further divided into a clock track having a signal recorded for each slot division, a sector track having a signal recorded for the beginning of each sector division and a reference track having a signal recorded for the beginning of the first sector. Corresponding to each utilization device, there is provided the necessary circuitry for producing the binary coded representation of the number of each sector division and a read signal only when the slot division to which that utilization device corresponds is in operative relationship with a signal sensitive device or transducer scanning the drum. In addition, there is provided the necessary circuitry for producing a selection signal in response to the coincident application thereto of the read signals and any data signal present within one of the cells of the drum. This selection signal is applied to shift circuitry which is associated with the sector counter circuitry and permits the binary coded representation of the number of the sector being scanned to be transferred into a storage device from which it may be taken and applied to the necessary switching circuitry to provide for the connection of the utilization device to the recorded signal source in which a signal group is recorded that is destinated for that utilization device.

Figure 2:
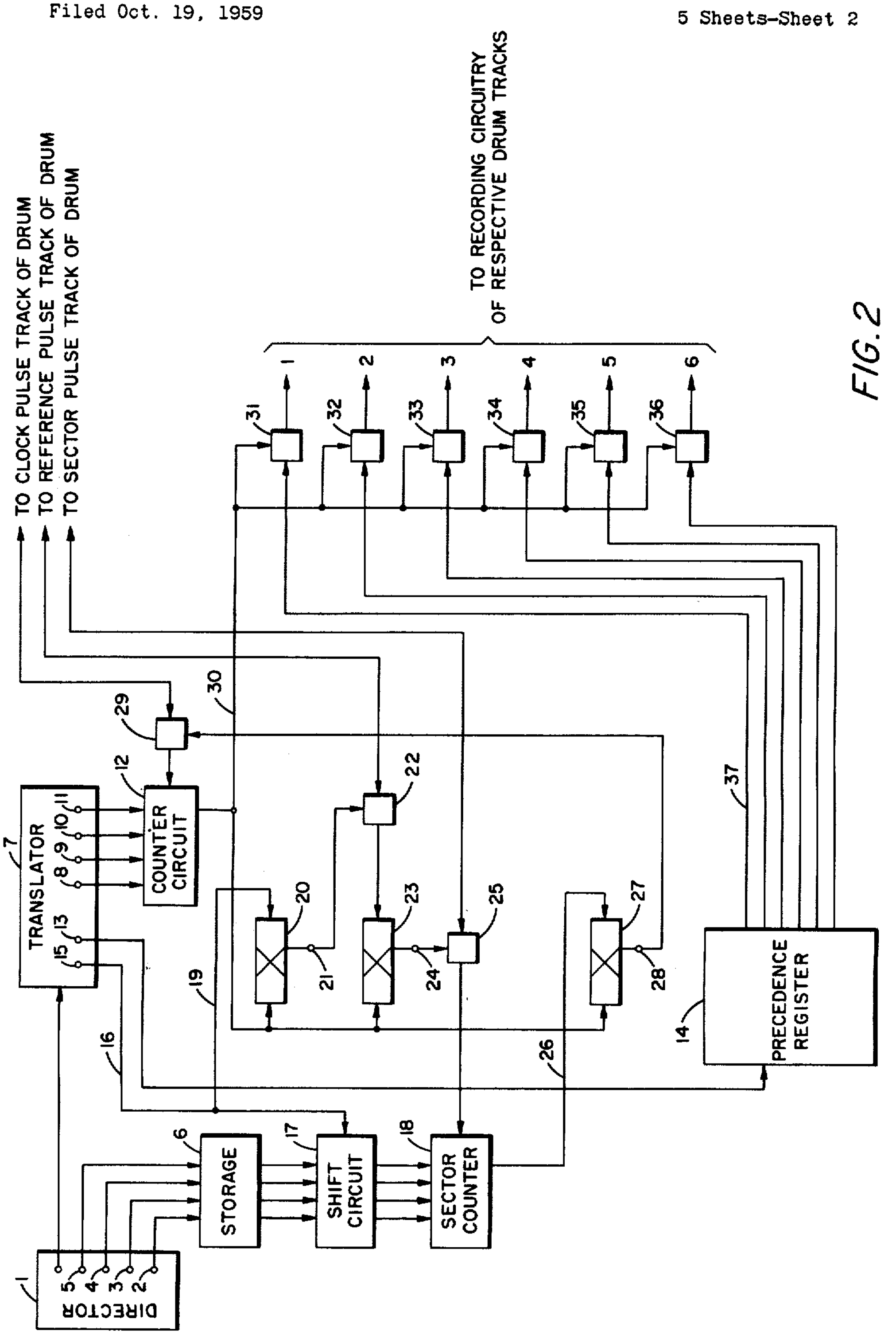
Figure 3:
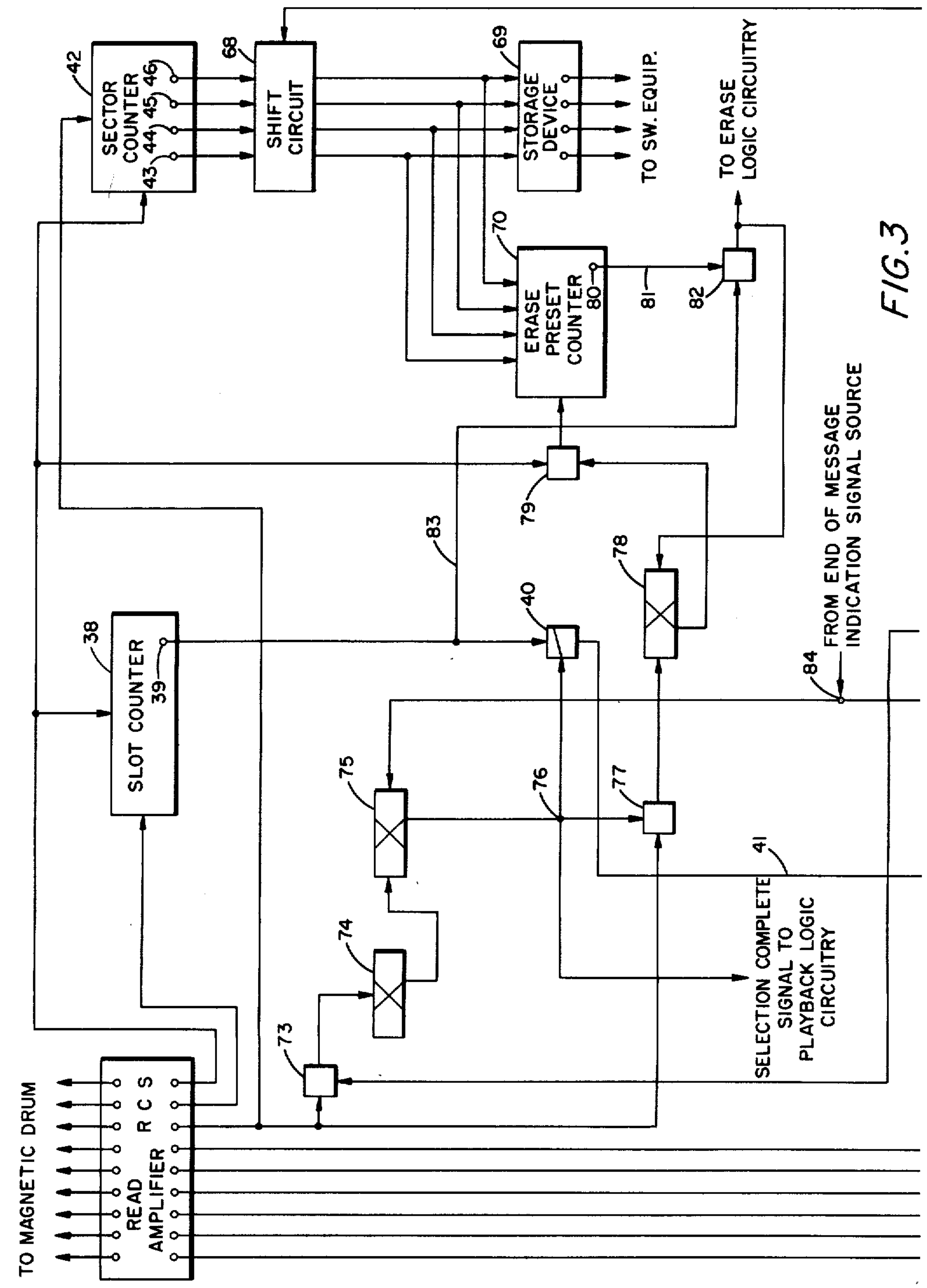
Figure 4:
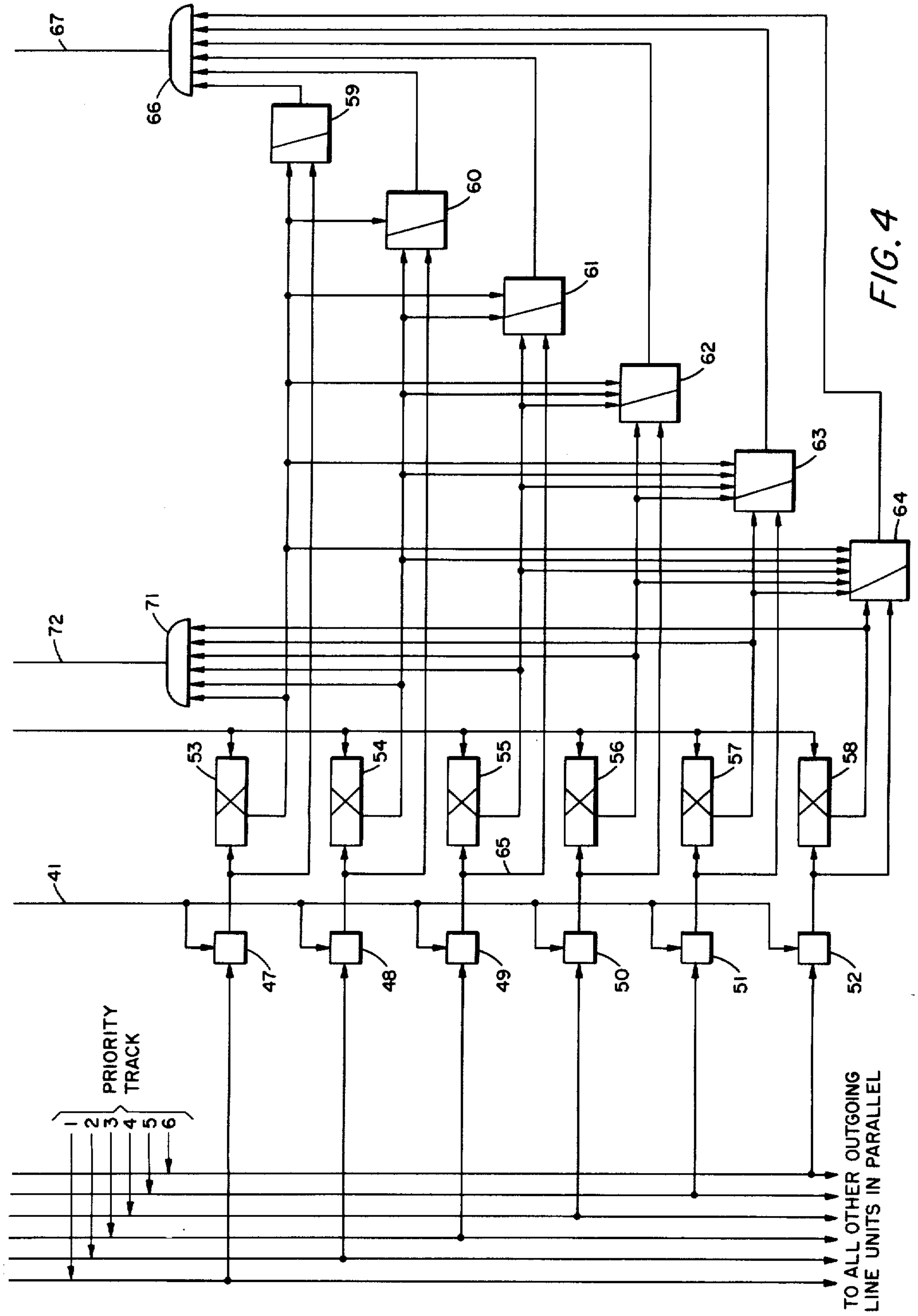
Figure 5:
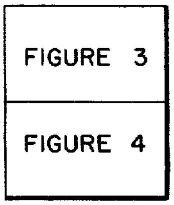
Figure 6:
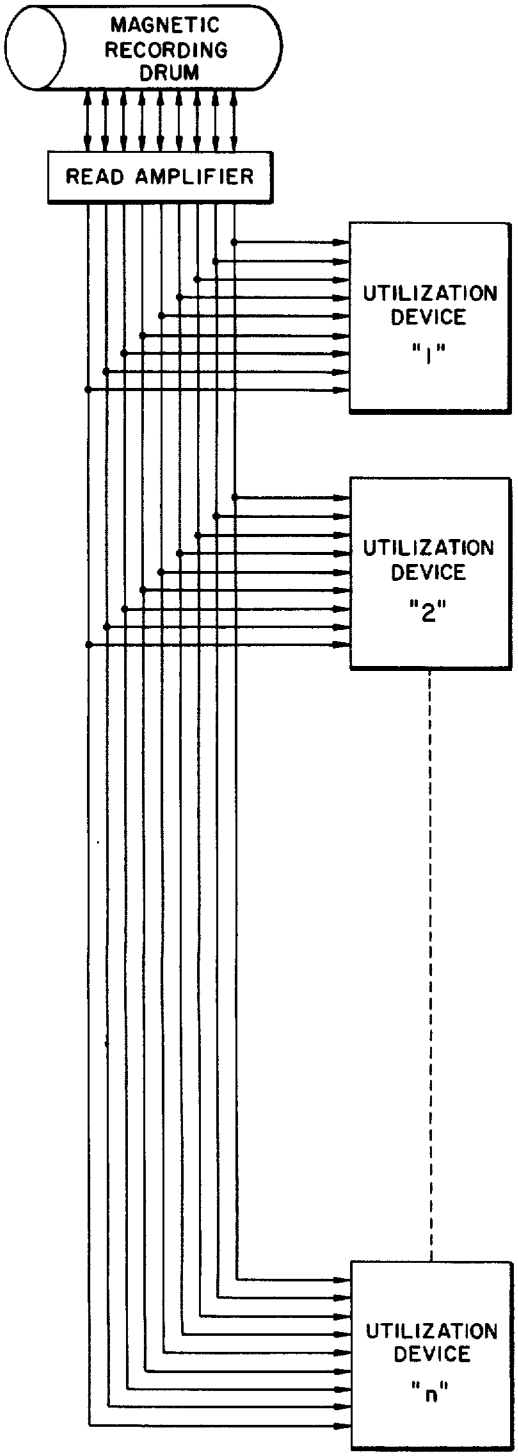

For a better understanding of the present invention, together with further objects, advantages and features thereof, reference is made to the following description and accompanying drawings, in which:

FIGURE 1 diagrammatically illustrates the sector, track and slot divisions around the periphery of the recording drum, FIGURE 2 schematically illustrates the necessary circuitry for providing for the recording of the data signals within the respective sub-division cells of the drum, FIGURES 3 and 4, when arranged as illustrated in FIGURE 5, schematically illustrate the necessary circuitry for providing the electrical signal which will enable the utilization device to be connected to the recorded signal sources, and FIGURE 6 diagrammatically illustrates the relation between the several utilization devices and the magnetic recording drum.

Without intention or inference of the limitation thereto, the operation of the multiple selector circuit of this invention will be described in relation to a teletype-writer switching office application. In installations of this type, each incoming line is brought into respective incoming line units. The electrical signal groups, comprising received messages, are taken from the incoming line units and magnetically recorded in any available one of a plurality of recording devices which serve as buffer storage devices from which the messages may be later removed and directed to the utilization devices to which they are destined. Further, each message received is generally assigned a priority precedence classification which provides for the highest priority messages to be directed to the utilization devices to which they are destined in a time relation earlier than lower priority precedence messages destined for the same utilization device. To properly select the multiple calls in descending order of priority precedence which may be recorded in the recorded signal sources is the purpose of the system of this invention.

A magnetic recording drum is divided into a plurality of sector divisions, each corresponding to an individual recorded signal source, a plurality of slot divisions, each corresponding to at least one respective utilization device and a plurality of track divisions corresponding to respective priority ratings in such a manner that the intersection of the track and slot divisions within each sector division form a plurality of sub-division cells each adapted to store a single data signal. A data signal present within any cell denotes the presence of a signal group in the recorded signal source to which the sector division containing that cell corresponds to a destination and priority as determined by the slot and track divisions which intersect to form that cell. This recording drum division layout is diagrammatically illustrated in FIGURE 1 where a portion of the periphery of the drum is indicated as being laid out upon a plane surface. While only four sectors are shown, it is to be specifically understood that more or less may be used, depending upon the number of recorded signal sources within the system. Each of the sectors is further sub-divided into a series of longitudinal slot divisions, each of which corresponds to at least one utilization device. In the diagrammatical illustration of FIGURE 1, each slot is shown as corresponding to a utilization device. That is, the first slot within each sector corresponds to utilization device 1, the second slot within each sector corresponds to utilization device 2, and so on. The longitudinal axis of the drum is further divided into a series of track divisions corresponding to respective priority ratings. Assuming there are six priority ratings of precedence, there is required a total of six priority track divisions, as shown. The intersections of the several priority track and slot divisions within each sector division form a plurality of sub-division cells each adapted to store a single data signal whereby a data signal present within any cell denotes the presence of a signal group in the recorded signal source to which the sector division containing that cell corresponds to a destination and priority as determined by the slot and track divisions which intersect to form that cell. Assuming that an "X" denotes the presence of a data signal within any cell, the diagrammatical illustration of FIGURE 1 shows that a priority rating one message is recorded in recording signal source 1 (Sector 1) which is destined for outgoing line unit 6, a priority rating three message is recorded in recorded signal source 2 (Sector 2) which is destined for utilization device 2 a priority rating two message is recorded in recorded signal source 3 (Sector 3) which is destined for utilization device 8 and a priority rating five message is recorded in recorded signal source 4 (Sector 4) which is destined for utilization device 10.

The magnetic drum is further divided into a clock track division with a clock signal recorded for each slot division, as indicated, a sector track division with a sector signal recorded for the beginning of each sector division, as indicated, and a reference track division with a reference signal recorded for the beginning of the first sector division, as indicated. The significance of these signals will be brought up in detail later.

Within a teletypewriter switching system, there is provided a director circuit which monitors each incoming message received and directs them to vacant storage devices where they are recorded. These storage devices serve as the recorded signal sources for the device of this invention. As director circuits of this type form no part of this invention and are well known in the art, it is illustrated in block form by reference numeral 1 of FIGURE 2. As the director circuit directs an incoming message to a vacant storage device, it produces the binary signal representation of the number of that storage device. Assuming that there are sixteen or less storage devices in this system, all of the storage device numbers may be represented by a 4 bit per group binary code representation. These binary signals are taken from output terminals 2, 3, 4 and 5 of director 1 and are stored in a separate storage device which, since the details are well known in the art and form no part of this invention, is illustrated in block form by reference numeral 6, FIGURE 2.

Also associated with the director circuitry is a translator device which is sensitive to the address and priority rating of received messages. As this translator device forms no part of this invention, it has been illustrated in block form by reference numeral 7 of FIGURE 2. As the translator device determines the address of a message, it produces the binary representation of the number of the utilization device to which that message is destined. Again assuming that there is a total of sixteen or less utilization devices in this system, this number may also be represented by a 4 bit per group binary code which is taken from translator 7 through output terminals 8, 9, 10 and 11 thereof and applied to a counter circuit. As this counter circuit may be any binary counter which is well known in the art, it has herein been illustrated in block form by reference numeral 12, FIGURE 2. The translator device further senses the priority rating of the received message, which may be taken from output terminal 13 thereof and applied to the precedence register which, since the details are well known in the art and form no part of this invention, has been illustrated in block form by reference numeral 14, FIGURE 2. At the same time, a selection made signal may be taken from output terminal 15 of translator 7 and applied through lead 16 to the input terminal of a shift circuit which, since the details form no part of this invention and are well known in the art, is illustrated in block form by reference numeral 17. The selection made signal applied to the input terminal of shift circuit 17 provides for the transfer of the binary signal representations present in storage device 6 into a sector counter which may be any binary counter system which is well known in the art and is, therefore, illustrated in block form by reference numeral 18. The selection made signal is also applied through lead 19 to one of the input terminals of a conventional flip-flop circuit which, since the details form no part of this invention, is illustrated in block form by reference numeral 20. Flip-flop circuits of this type have two stable conditions of operation, hereinafter referred to as the set and reset conditions, which may be produced by successive trigger signals applied to the respective input terminals thereof. In the reset condition, it will be assumed that a ground potential signal is present upon output terminal 21 thereof while in the set condition, as produced by the selection made signal applied to lead 19, there is a negative potential signal present upon output terminal 21 thereof.

The negative potential signal upon output terminal 21 of flip-flop 20 is applied to a respective input terminal of a conventional two input AND gate which, since the details form no part of this invention and are well known in the art, is illustrated in block form by reference numeral 22. To enable AND gates of this type for the conduction of a signal thereto, it is necessary that coincident signals be applied to the respective input terminals thereof. The other input terminal of AND gate 22 is connected to a signal sensitive device in operative arrangement with the reference pulse track of the magnetic recording drum of this invention. As there is only one reference signal recorded in this track at the beginning of the first sector division of the track, as is illustrated in FIGURE 1, there is a coincident application of two signals to the respective input terminals of AND gate 22 only when flip-flop 20 is in its set condition, as produced by the selection made signal from lead 19, and a reference pulse from the reference pulse track of the magnetic drum. At this time, a signal is produced at the output terminal of AND gate 22 which serves to trigger another conventional flip-flop circuit which is identical in operation to flip-flop circuit 20 and, therefore, is illustrated in block form by reference numeral 23. As this signal serves to trigger flip-flop 23 to its set condition, a ground potential signal is applied to a respective input terminal of another two input AND gate, identical to AND gate 22, illustrated in block form by reference numeral 25. The other respective input terminal of AND gate 25 is connected to a signal sensitive device in operative relationship with the sector pulse track of the magnetic recording drum of this invention. As this track contains a recorded signal at the beginning of each sector division, as illustrated in FIGURE 1, there is a coincident application of two signals to the respective input terminals of two input AND gate 25 at the beginning of each sector division of the drum, while flip-flop 23 is in its set condition. The resulting output signal is applied to the input terminal of sector counter 18 which counts the sectors as they pass beneath the signal sensitive device in operative relation with the sector pulse track of the magnetic recording drum.

Sector counter 18 is arranged to produce an output signal only when the sector which corresponds to the recorded signal source in which the message is recorded is being scanned by the signal sensitive devices in operative relation with the magnetic recording drum. As this signal is produced, it is applied through lead 26 to a respective input terminal of a conventional flip-flop circuit 27 which is identical in operation to flip-flop circuits 20 and 23 and, therefore, is herein illustrated in block form.

This signal serves to set flip-flop 27 with the resulting signal appearing on output terminal 28 thereof. This signal is applied to a respective input terminal of a conventional two input AND gate 29 which, being identical in operation to that of AND gates 22 and 25, has herein been illustrated in block form. The other respective input terminal of AND gate 29 is connected to a signal sensitive device in operative arrangement with the clock pulse track of a magnetic recording drum of this invention. Therefore, an output signal is produced by AND gate 29 as each slot of the magnetic recording drum is scanned by the signal sensitive devices. These output pulses are applied to the input terminal of circuit counter 12 which counts the slots as they are scanned and is arranged to produce an output signal only when the slot corresponding to the utilization device for which the recorded message is destined is being scanned.

As this output signal is produced, it is applied through lead 30 to respective input terminals of conventional two input AND gates, illustrated in block form by reference numerals 31, 32, 33, 34, 35 and 36. The other input terminals of these two input AND gates are connected to the output terminals of precedence register 14. As precedence register 14 puts out a signal in the output circuit corresponding to the priority rating as determined by translator 7, the associated AND gate is thereby enabled, which provides for the passage therethrough of the signal from counter circuit 12 which is applied to the recording circuitry of the respective drum tracks and produces the data signal in the proper cell thereon. For example, assuming that translator 7 has sensed a message with a priority rating 1, the priority signal from precedence register 14 would be applied through lead 37 to gate 31 coincidentally with the output of counter circuit 12, thereby producing an output pulse which would energize the recording circuitry of the priority rating one track of the magnetic drum. However, gates 32, 33, 34, 35 and 36 would be ineffective to pass a signal pulse from counter circuit 12 in that there would be no coincidental priority rating pulse applied thereto at this time.

FIGURES 3 and 4, when arranged as shown in FIGURE 5, schematically illustrate the selection circuitry of the device of this invention. These two figures detail the equipment necessary for each utilization device. For a better understanding of the relation of this equipment to the overall scheme, FIGURE 6 diagramatically illustrates the connections to the magnetic recording drum where the blocks labelled Utilization Device 1, Utilization Device 2, and Utilization Device N contain all of the equipment detailed in FIGURES 3 and 4.

As the drum revolves, the clock signals which are scanned by a signal sensitive means in operative arrangement with the clock track of the recording drum are applied to the input circuitry of a slot counter. As this counter may be any of the binary counter schemes and as the details thereof form no part of this invention, it has herein been illustrated in block by reference numeral 38, FIGURE 3. This slot counter is arranged to produce a read output signal only when the slot position to which the utilization device with which it is associated corresponds in operative relationship with the signal sensitive device scanning the clock track of the drum. This may be accomplished through the medium of presetting the counter with the complement of the number of the utilization device with which it is associated to the base as determined by the greatest number which the counter may count. For example, with a counter which may count a total of 16, and assuming it is associated with utilization device 2, the slot counter 38 may be preset to 14, which is the complement of 2 in relation to 16. Therefore, at the end of two pulses, an output read signal will appear upon output terminal 39 of slot counter 38. This output signal is applied to a respective input terminal of an inhibiting gate which, since the details are well known in the art and form no part of this invention, is illustrated in block form by reference numeral 40. Gates of this type are well known in the art and are designed to inhibit the passage of a signal therethrough with the presence of another signal at the other respective input terminal thereof. Assuming for the moment that there is not signal present upon the other input terminal of gate 40, the read pulse produced by slot counter 38 is conducted through gate 40 and appears in lead 41. The significance of this read signal will be brought out in detail later.

The pulses produced by the sector signals appearing at the beginning of each sector division in the sector track division of the recording drum is applied to the input terminal of a sector counter which, since the details form no part of this invention and are well known in the art, is illustrated in block form by reference numeral 42. This counter may be any binary counter scheme which will produce the binary representation of the number of the sector, hence the number of the recorded signal source, which is being scanned by the signal sensitive devices in operative relationship with the magnetic drum. The binary signal representation thus produced will appear upon respective output circuit terminals 43, 44, 45 and 46 thereof.

Each of the leads from the priority track divisions are applied to one input terminal of respective two input AND gates which, since the details form no part of this invention and are well known in the art, are illustrated in block form by reference numerals 47, 48, 49, 50, 51 and 52 of FIGURE 4. That is, the lead from the sensing device of priority track 1 is connected to one of the input terminals of gate 47, priority track 2 to the input terminal of gate 48, priority track 3 to one of the input terminals of gate 49, priority track 4 to one of the input terminals of gate 50, priority track 5 to one of the input terminals of gate 51 and priority track 6 is connected to one of the input terminals of gate 52. Connected to the other input terminals of each of AND gates 47 through 52, inclusive, is lead 41 in which appears the read signal produced by slot counter 38. Therefore, with the coincident presence of a read signal and a data signal upon the respective input terminals any one of these AND gates will produce a selection signal which will appear upon the output terminal of that gate. Assuming that the read signal is present in lead 41 and that a data signal is present in priority rating track 3 of the magnetic drum, the coincident presence of these two signals upon AND gate 49 will result in a selection signal upon the output circuit terminal thereof. Similarly, selection signals may appear on the output terminals of any of the other AND gates with the coincident presence of the aforementioned signals.

The selection signals as produced by AND gates 47 through 52, inclusive, are used to trigger associated flip-flop circuits which, since the details are well known in the art and form no part of this invention, are illustrated in block form by reference numerals 53, 54, 55, 56, 57 and 58. In addition, the selection signals are also applied to respective input terminals of inhibiting gates which, since the details are well known in the art and form no part of this invention, are illustrated in block form by reference numerals 59, 60, 61, 62, 63 and 64. The flip-flop circuits 53 through 58, inclusive, are identical in operation with those flip-flop circuits 20, 23 and 27 as described in relation to FIGURE 2 and the selection signals serve as trigger signals to produce the set condition in these flip-flops with the resulting negative signal appearing on the output terminals thereof.

The negative signals appearing on the output terminals of respective flip-flops 53 to 58, inclusive, serve as inhibiting signals which are applied to inhibiting gates 59 through 64, inclusive, and also as inhibiting pulses to subsequent inhibiting gates. For example, a signal pulse appearing upon the output terminal of flip-flop 55 serves as an inhibiting signal to gate 61 and also to gates 62, 63 and 64. However, under these conditions, gates 59 and 60 are not inhibited thereby. With this arrangement, the sensing of a data signal of a priority rating three or lower will not be passed by gates 61, 62, 63 or 64, however, should a higher priority rating data signal be sensed, it would be passed by gate 59 in the event it was a priority one signal or by gate 60 in the event it was a priority two signal. In this manner then, the data signals from the priority track divisions of the magnetic recording drum are passed only in descending order of precedence.

For example, assuming that the circuitry as detailed in FIGURES 3 and 4 is associated with utilization device 2 and referring to the drum division layout of FIGURE 1, it may be noted that a precedence 3 message is recorded in recorded signal source 2 which is destined for utilization device 2. Therefore, as the magnetic recording drum revolves the binary representation of the sector being scanned is produced by sector counter 42, FIGURE 5, and with the application of the sector clock pulse to the input terminal of preset slot counter 38, a read signal is produced upon output terminal 39 thereof and applied to one of the input terminals of inhibiting gate 40. Assuming that there is no signal present upon the other input terminal of inhibiting gate 40, this read pulse is conducted therethrough and appears upon lead 41 and is applied simultaneously to all of the two input AND gates 47 through 52, inclusive, of FIGURE 4. The signal produced by the recorded data signal upon priority track 3, slot 2 of Sector 2 of the magnetic recording drum is applied to the other input terminal of AND gate 49 coincidentally with the read signal. The coincident presence of these two signals results in a selection signal upon the output terminal of gate 49 which is applied through lead 65 to the input terminal of inhibiting gate 61. As there are no inhibiting signals present upon the other input terminals of inhibiting gate 61, this selection signal is conducted therethrough and is applied to one of the input terminals of a six input OR gate which, since the details are well known in the art and form no part of this invention, is illustrated in block form by reference numeral 66. OR gates of this type are well known and are arranged to conduct therethrough a signal with the application of an input signal to any one or combination of the input terminals thereof. Therefore, the selection signal from inhibitor gate 61 is conducted therethrough and appears in lead 67. The significance of this selection signal will be brought out in detail later.

The selection signal present upon the output terminal of AND gate 49 also triggers flip-flop 55 to its set condition with the accompanying negative potential signal upon the output terminal thereof. This negative potential signal is applied as an inhibiting signal to the associated inhibitor gate 61 and also to the inhibitor gates 62, 63 and 64 associated with flip-flops which correspond to lower priority rating signals, as indicated. With this arrangement, any selection signal produced by the coincident presence of a read signal and a data signal pulse coincidentally applied to either gates 49, 50, 51 or 52 will not be passed through respective inhibitor gates 61, 62, 63 or 64 in that they are all inhibited by the negative potential signal upon the output terminal of flip-flop 55. However, should a higher priority data signal appear and be applied to AND gates 47 or 48 coincidentally with the read input signal, the resulting selection signal will be passed by respective inhibitor gates 59 or 60 in that they are not inhibited at this time. In this event, the flip-flop circuit associated with the AND gate which produces this selection signal will, of course, be triggered to its set condition, with the resulting negative potential inhibiting signal present upon the output terminal thereof which will in turn inhibit all of the inhibiting gates of the same or lower precedence as has previously been described.

The selecting signal which appears upon lead 67 is applied to the input terminal of a conventional shift circuit which is connected to the output terminals of sector counter 42, FIGURE 3. As shift circuits of this type are well known in the art and the details form no part of this invention, it is herein illustrated in block form by reference numeral 68. Upon being enabled by the selection signal, the binary representation of the sector being scanned which appears upon output terminals 43, 44, 45 and 46 of sector counter 42 is transferred through shift circuit 68 and is stored in a conventional storage device which, since the details form no part of this invention and are well known in the art, is illustrated in block form by reference numeral 69. This binary representation may then be taken from the output terminals of storage device 69 and applied to external switching equipment, not shown. This external switching equipment will, upon the basis of the binary representation signals taken from storage device 69, operate the necessary switching circuitry to connect utilization device 2 to recorded signal source 2.

As the binary representation appearing in sector counter 42 is transferred to storage device 69, it is simultaneously transferred to an erase preset counter which, since the details form no part of this invention and are well known in the art, as illustrated in block form by reference numeral 70. This erase preset counter is arranged to produce an output signal during that portion of the magnetic drum revolution when the sector number as represented by the binary signals appearing upon sector counter 42 is again being scanned by the signal sensitive devices in operative relationship with the magnetic recording drum. Again, this may be accomplished by presetting the counter 70 to the complement of the number of the sector and counting it down with the sector pulses.

As any of the flip-flops 53 through 58, inclusive, of FIGURE 4, are triggered to their set condition, the negative potential signal upon the output terminal thereof is applied to respective input terminals of a six input OR gate which, since the details are well known in the art and form no part of this invention, is illustrated in block form by reference numeral 71. As OR gate 71 passes this signal to lead 72 it is applied to one of the input terminals of a conventional two input AND gate which, as the details are well known in the art and form no part of this invention, is illustrated in block form by reference numeral 73, FIGURE 3. The lead which is connected to the signal sensitive device of the reference track of the recorded drum is connected to the other input terminal of this AND gate 73. The coincident presence of the signal from OR gate 71 and two signal pulses from the reference track of the magnetic drum are conducted by AND gate 73 and applied to the input terminal of a conventional bistable multivibrator which, since the details are well known in the art and form no part of this invention, is illustrated in block form by reference numeral 74. In multivibrators of this type, alternate conditions of operation may be produced by successive input signals applied htereto. As the second input signal is applied to the input terminal of multivibrator 74 from the reference signal recorded upon the reference track division of the magnetic recording drum, the resulting output signal is applied as a trigger signal to the input terminal of a conventional flip-flop which, since the details are well known in the art and form no part of this invention, is illustrated in block form by reference numeral 75. As the set condition is produced in flip-flop 75 by the trigger signal produced by multivibrator 74, a negative potential signal appears at output terminal 76 thereof. This potential signal will appear with every two revolutions of the magnetic recording drum to insure that at least one selection of a recorded message has been effected.

The negative potential signal appearing upon output terminal 76 is applied as an inhibiting signal to inhibiting gate 40, thereby preventing the passage of read signals therethrough from output terminal 39 to slot counter 38. At the same time, this signal is applied to one of the input terminals of a conventional two input AND gate which, since the details are well known in the art and form no part of this invention, is illustrated in block form by reference numeral 77. With the next reference signal from the reference data pulse recorded upon the reference track division of the magnetic recording drum, it is applied simultaneously to the other input terminal of AND gate 77, with the resulting output signal therefrom serving as a trigger signal for a conventional flip-flop circuit illustrated in block form by reference numeral 78. As flip-flop 78 is triggered to its set condition, the negative potential signal appearing at the output terminal thereof is applied to one of the input terminals of a conventional two input AND gate illustrated in block form by reference numeral 79. The pulses from the sector track division of the magnetic recording drum are applied to the other input terminal of AND gate 79, with the resulting output signal therefrom serving as input signals to erase preset counter 70, which serves to count this counter down. As the sector corresponding to the number produced in sector counter 42 with the selection cycle, is being scanned, an output signal appears upon output terminal 80 of erase preset counter 70 and is applied through lead 81 to one of the input terminals of a conventional two input AND gate 82. As the drum continues revolving, the clock pulses are counted in slot counter 38 and, when the slot to which utilization device 2 corresponds is being scanned by the signal sensitive devices in operative relation therewith, the read signal produced upon output terminal 39 of slot counter 38, although inhibited by inhibiting gate 40 from being passed through to lead 41, is applied through lead 83 to the other input terminal of AND gate 82. The resulting output signal is applied to erase logic circuitry, not shown, and erases the signal data recorded in that cell from the drum in that the selection of the message denoted thereby has been made.

This erase signal is also applied back to the input terminal of flip-flop 78, thereby resetting flip-flop 78 and removing the negative potential signal from the output terminal thereof and from the input terminal of two input AND gate 79.

Included within the recorded signal source is an end of message signal detector which produces an output pulse as the end of the message has been sensed. This output pulse is applied through terminal 84, FIGURE 3, to an input terminal of flip-flop 75, thereby resetting flip-flop 75, and the input terminals of flip-flops 53 through 58, inclusive, of FIGURE 4, thereby resetting these flip-flops and preparing the system to select the next message destined for utilization device 2.

While a preferred embodiment of the present invention has been shown and described, it will be obvious to those skilled in the art that various modifications in the substitution may be made without departing from the spirit of the invention which is to be limited only within the scope of the appended claims.

What is claimed is:

1. In an electrical switching system in which any one of a plurality of electrical signal groups recorded in any one of a plurality of recorded signal sources may be directed to any combination of one or more utilization devices in accordance with a predetermined program in respect to priority and destination, the multiple selection system which will produce for each utilization device an electrical signal which will enable that utilization device to be connected to the recorded signal sources in which are recorded electrical signal groups destined for that utilization device in descending order of precedence comprising, cyclic memory means divided into a plurality of sector divisions, each corresponding to an individual recorded signal source, a plurality of slot divisions, each corresponding to at least one respective utilization device and a plurality of priority track divisions corresponding to respective priority ratings in such a manner that the intersection of the priority track and slot divisions within each sector division form a plurality of subdivision cells each adapted to store a single data signal whereby a data signal present within any cell denotes the presence of a signal group in the recorded signal source to which the sector division containing that cell corresponds to a destination and priority as determined by the priority track and slot divisions which intersect to form that cell; said cyclic memory means having a sector track division with a sector signal recorded for the beginning of each sector division and a reference track division with a reference signal recorded for the beginning of the first sector division thereon; a source of clock pulses synchronized with said cyclic memory means, a signal sensitive means for each track division in operative relationship with each of said slot divisions once during each cycle of said memory means, first circuit means coupled to said source of clock pulses and responsive to said clock signals for producing a read signal only when the slot division to which that utilization device corresponds is in operative relationship with said signal sensitive means; second circuit means responsive to said sector signals for producing signal representations of each sector division during the time the slot divisions included therein are successively in operative relationship with said signal sensitive means; third circuit means for producing a selection signal upon the receipt of a read signal and a first data signal provided that no data signal is present in a priority track division having a higher priority rating than the rating of the track division containing said first data signal, and which is contained in a slot assigned to the utilization device corresponding to said third circuit means, storage circuit means coupled to said second circuit means for storing the signal representations produced by said second circuit means, and shift circuit means interconnected between said second circuit means and said storage circuit means for effecting the transfer of the signal representations produced by said second circuit means to said storage circuit means in response to the application thereto of said selection signal.

2. The combination as set forth in claim 1 wherein said first circuit means includes a preset counter for counting said clock pulses.

3. The combination as set forth in claim 1 wherein said second circuit means includes a counting circuit for counting said sector signals.

References Cited in the file of this patent

UNITED STATES PATENTS

| | | |
|---|---|---|
| 2,714,843 | Hooven | Aug. 9, 1955 |
| 2,723,311 | Malthaner et al. | Nov. 8, 1955 |
| 2,799,845 | Dieterich | July 16, 1957 |
| 2,951,234 | Spielberg | Aug. 30, 1960 |
| 2,978,685 | Eckdahl | Apr. 4, 1961 |